US009245436B1

(12) United States Patent
Crook

(10) Patent No.: US 9,245,436 B1
(45) Date of Patent: Jan. 26, 2016

(54) HYDROGEN SULFIDE ALARM METHODS

(71) Applicant: Gary W. Crook, Midland, TX (US)

(72) Inventor: Gary W. Crook, Midland, TX (US)

( * ) Notice: Subject to any disclaimer, the term of this patent is extended or adjusted under 35 U.S.C. 154(b) by 19 days.

(21) Appl. No.: 14/464,769

(22) Filed: Aug. 21, 2014

Related U.S. Application Data

(63) Continuation-in-part of application No. 13/631,960, filed on Sep. 29, 2012, now Pat. No. 9,019,117.

(51) Int. Cl.
*G01V 3/00* (2006.01)
*G08B 21/14* (2006.01)
*G08C 17/02* (2006.01)

(52) U.S. Cl.
CPC ................ *G08B 21/14* (2013.01); *G08C 17/02* (2013.01)

(58) Field of Classification Search
CPC combination set(s) only.
See application file for complete search history.

(56) References Cited

U.S. PATENT DOCUMENTS 7,463,160 B2 * 12/2008 Crook ................ G01N 33/0075 340/531
9,019,117 B1 * 4/2015 Crook ....................... E02B 1/00 340/853.1

* cited by examiner

*Primary Examiner* — Travis Hunnings
(74) *Attorney, Agent, or Firm* — www.bobharter.com; Robert J. Harter

(57) ABSTRACT

H2S (hydrogen sulfide) alarm methods include automated systems for creating reports, initiating different safety drills and/or recording certain calibration and bump tests. The methods being automated reduces the chance of human error and falsified records. The H2S alarm methods are particularly useful for ensuring the safety of workers at remote worksites.

20 Claims, 7 Drawing Sheets

HYDROGEN SULFIDE ALARM METHODS

CROSS REFERENCE TO RELATED APPLICATIONS

This application is a Continuation-In-Part of application Ser. No. 13/631,960 filed on Sep. 29, 2012; and this application claims the benefit of provisional patent application Ser. No. 61/624,903 filed on Apr. 16, 2012 by the present inventor.

FIELD OF THE DISCLOSURE

The subject invention generally pertains to H2S gas alarm methods and more specifically to performing tests and recording emergency responses.

BACKGROUND

In some locations, it may be important to monitor the concentration H2S (hydrogen sulfide) to alert people of hazardous levels of the gas. When the monitored area is a remote worksite, sometimes others beyond the worksite are also notified. The term, "remote," means a separation distance of at least ten miles. Examples of H2S monitoring systems are disclosed in U.S. Pat. Nos. 6,954,143; RE40,238 and 7,463,160; all of which are specifically incorporated by reference herein.

DETAILED DESCRIPTION

Figure 1:
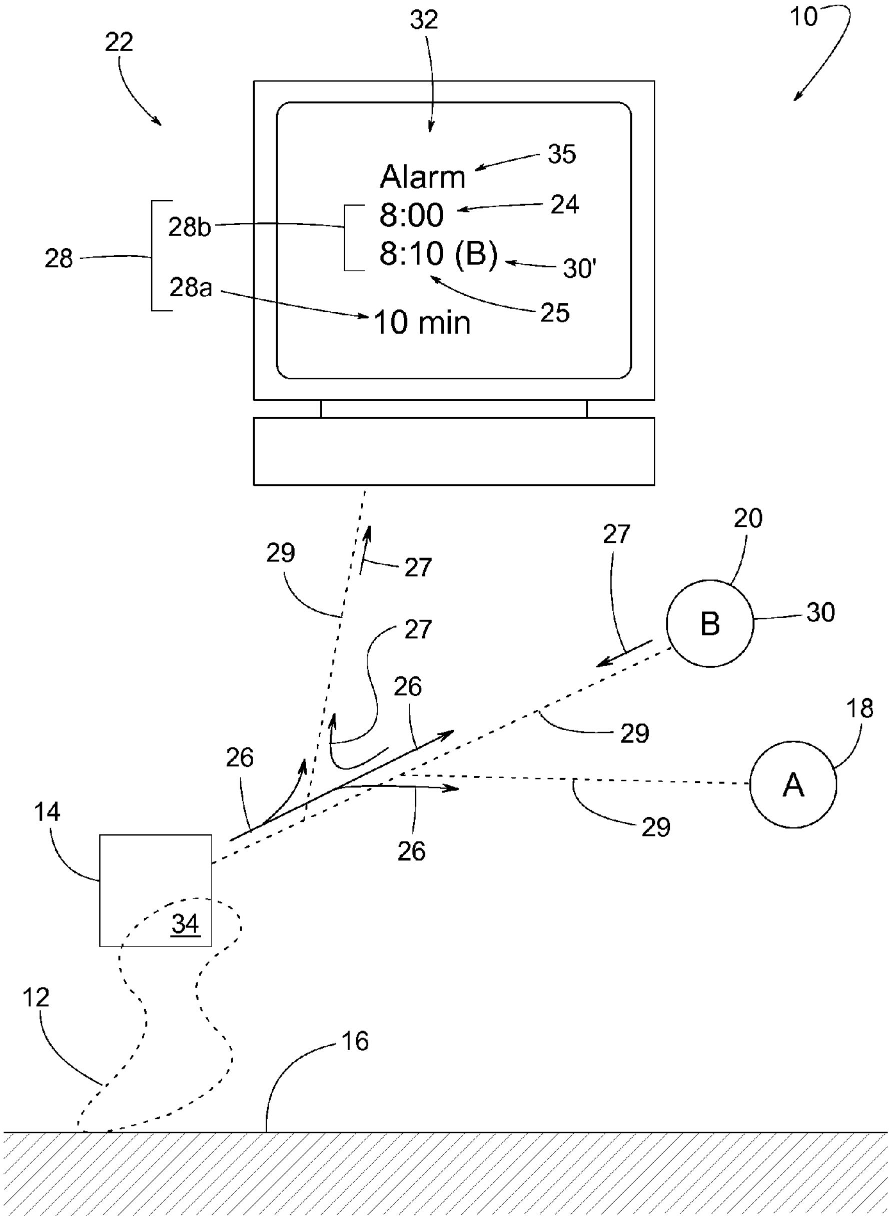
FIG. 1 is a schematic diagram of one example H2S alarm method.
Figure 2:
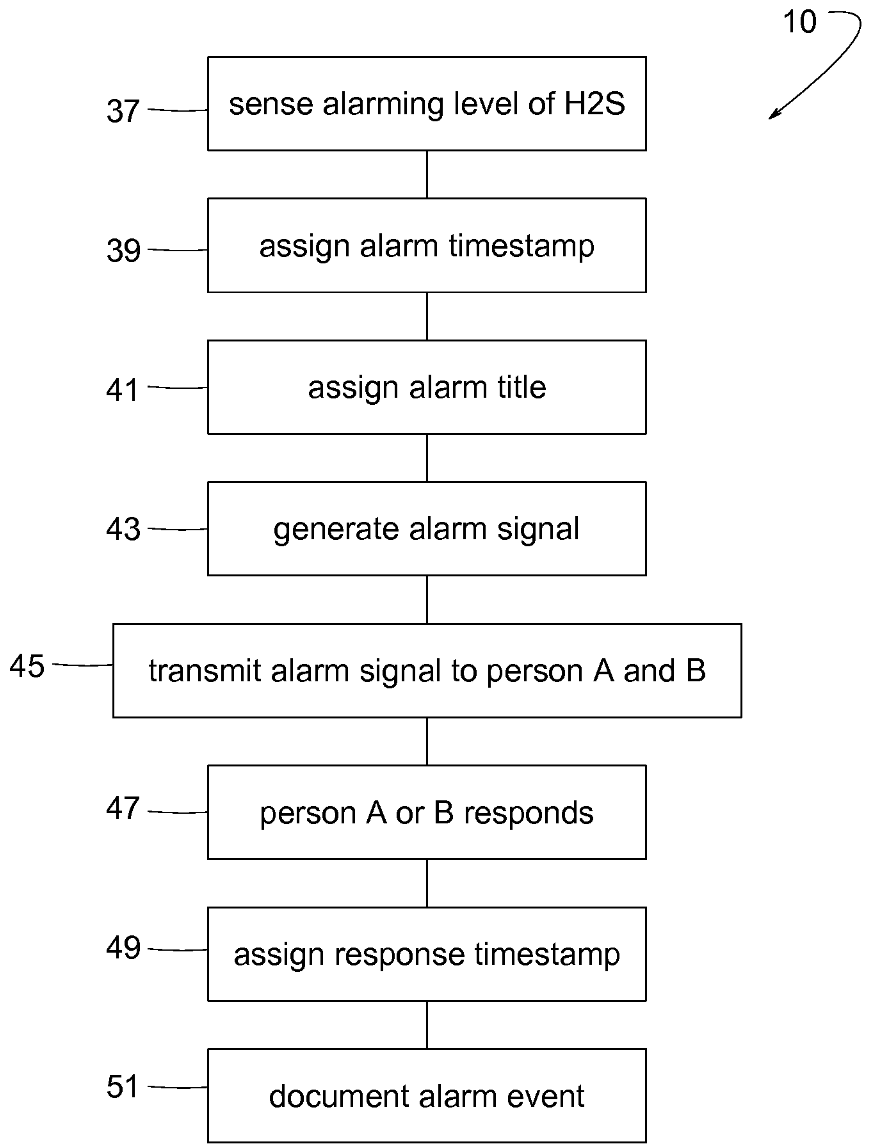
FIG. 2 is a block diagram further illustrating the H2S alarm method shown in FIG. 1.

FIGS. 1 and 2 show an example H2S alarm method 10 for a remote worksite 16 (e.g., a wellsite) where a group of workers might experience an alarm event 34 (e.g., high concentration of H2S). In response to sensing H2S gas 12 at a concentration exceeding a predetermined threshold, an H2S monitor 14 at worksite 16 sends an alarm signal 26 to a computer system 22 and multiple potential responders, e.g., a person-A 18 and a person-B 20. To acknowledge having received alarm signal 26 and to accept responsibility for dealing with alarm event 34, person-A 18 and/or person-B 20 responds by sending a response signal 27 to computer system 22. Computer system 22 then documents alarm event 34 by creating a report 32 that, in some examples, includes an alarm title 35 and a response time 28. Alarm title 35 is any identifier providing some information related to alarm event 34, e.g., worksite location, worksite name, type or nature of the alarm event, etc.

In some examples, response time 28, as recorded in report 32, pertains to which of person-A 18 or person-B 20 was a first-to-respond person 30, i.e., the first to send response signal 27. Report 32 records first-to-respond person 30 by way of a person identifier 30' (name, code, etc.), which in the illustrated example happens to correspond to person-B 20. A slower-to-respond person (person-A 18 in this particular example) would be the one that failed to respond or responded later than the first-to-respond person.

Report 32 can document response time 28 in various ways. In some examples, for instance, response time 28 is documented in report 32 as a combination **28*b* of an alarm timestamp 24 and a response timestamp 25. Alarm timestamp 24 is the approximate time that alarm event 34 started. In some examples, alarm timestamp 24 is the time H2S monitor 14 sent out alarm signal 26. In some examples, alarm timestamp 24 is the time computer system 22 received alarm signal 26. Response timestamp 25 is the approximate time that the first-to-respond person 30 (person-A or person-B) sent out response signal 27. In some examples, response timestamp 25 is the time computer system 22 received response signal 27. In some examples, response time 28 is documented in report 32 as a difference 28*a* between alarm timestamp 24 and response timestamp 25. In the illustrated example, difference 28*a*** equals ten minutes.

Report 32 can be in various formats including, but not limited to, a single screen shot displayed on a computer screen of computer system 22, multi-page screen shots displayed on a computer screen of computer system 22, a single page printed document, a multi-page printed document, etc. In some examples, computer system 22 comprises one or more computers examples of which include, but are not limited to, a desktop computer, a laptop computer, a server, a smartphone, tablet, etc.

In some examples, H2S monitor 14 at worksite 16, a computer of computer system 22, person-A 18 and person-B 20 are all remote relative to each other. In some examples, a wireless communication system 29 (satellite, radio waves, cell towers, antennas, etc.) provides wireless communication links between two or more remote elements 14, 18, 20 and 22. The term, "wireless" means at least some portion of a communication link conveys a signal (e.g., signals 26 and 27) without wires through air.

In some examples, H2S alarm method 10 is carried out as shown in FIG. 2, wherein block 37 illustrates H2S monitor 14 sensing the alarming level of H2S 12 at worksite 16. Block 39 illustrates assigning alarm timestamp 24 to alarm event 34. Block 41 illustrates assigning alarm title 35 to alarm event 34. Block 43 illustrates H2S monitor 14 generating alarm signal 26 as a consequence of sensing the alarming level of H2S at worksite 16. Block 45 illustrates wirelessly transmitting alarm signal 26 to person-A and to person-B, wherein one of them is the first-to-respond person 30. Block 47 illustrates the first-to-respond person 30 responding to alarm signal 26. Block 49 illustrates assigning response timestamp 25 to the first-to-respond person 30, wherein, in some examples, timestamp 25 identifies a time-of-day at which the first-to-respond person 30 responded to alarm signal 26. Block 51 illustrates computer system 22 generating report 32 documenting alarm event 34, alarm title 35, response time 28, and person-identifier 30' identifying first-to-respond person 30, wherein response time 28 is the difference **28*a* between alarm timestamp 24 and response timestamp 25 and/or a display of both alarm timestamp 24 and response timestamp 25**.

Figure 3:
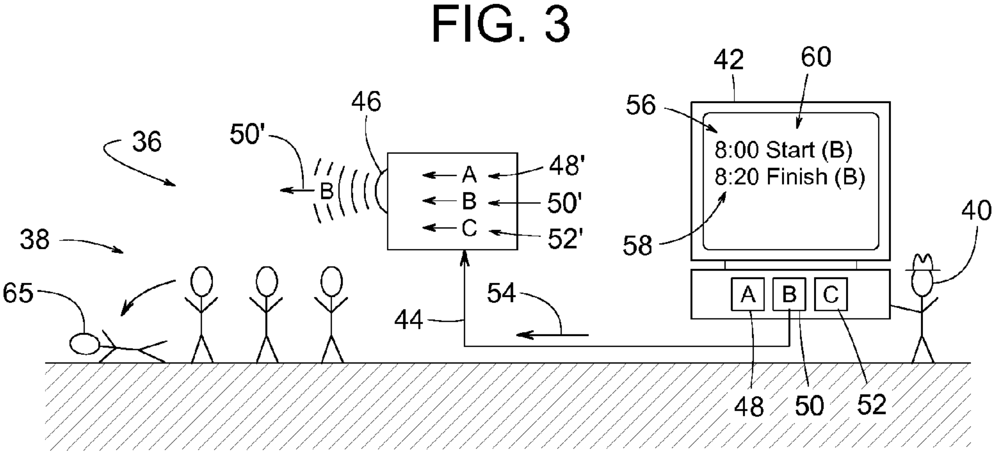
FIG. 3 is a schematic diagram of another example H2S alarm method.
Figure 4:
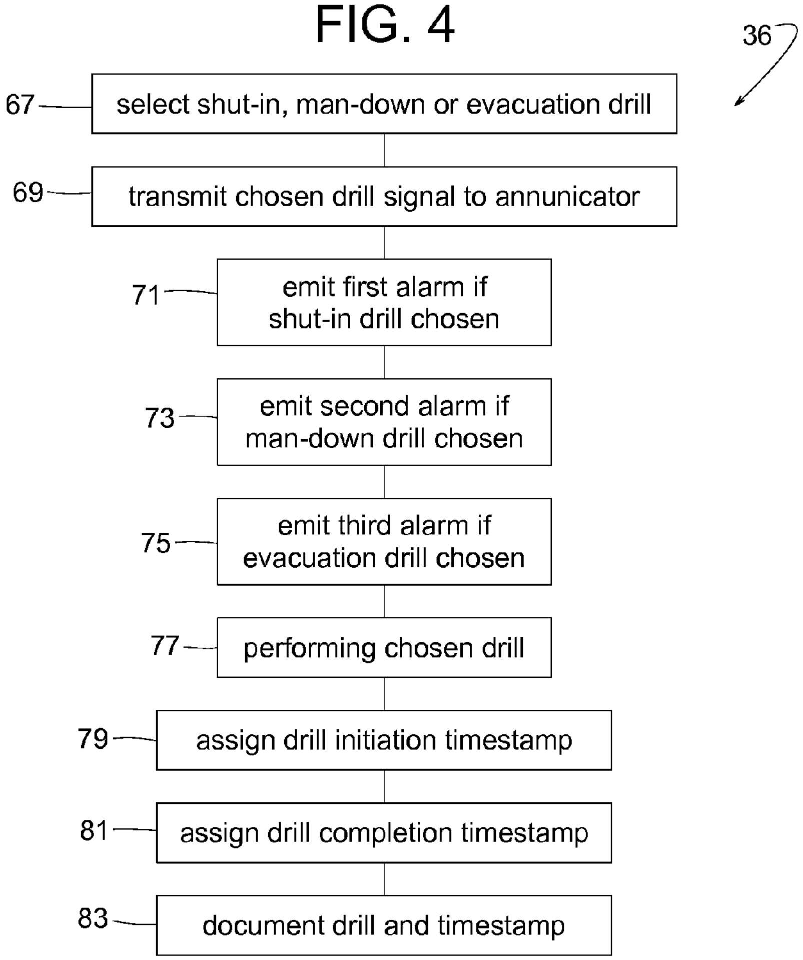
FIG. 4 is a block diagram further illustrating the H2S alarm method shown in FIG. 3.

FIGS. 3 and 4 illustrate an example H2S alarm method 36 for a group of workers 38 at risk for exposure to hazardous concentrations of H2S gas. To prepare workers 38 for various emergencies, method 36 provides means for periodically initiating various emergency response drills, and automatically generating a report 60 that documents the drills and when they were run. Examples of such drills include, but are not limited to, a shut-in drill 48, a man-down drill 50, and an evacuation drill 52.

In some examples of shut-in drill 48, a designated person 65 (e.g., some chosen member of workers 38) lies down pretending to be in distress and needing help, and other members of workers 38 respond accordingly. In some examples of shut-in drill 48, workers 38 close a plurality of fluid valves associated with worksite 16, wherein worksite 16 in this example is a well site. In some examples of evacuation drill 52, workers 38 begin leaving worksite 16.

In some examples, a coordinator 40 (e.g., supervisor, manager, or a member of workers 38) initiates a desired drill using a control system 42, which is in communication with an annunciator 46 (audible alarm) that is in the vicinity of workers 38. In some but not all examples, control system 42 and annunciator 46 are remote relative to each other, and a wireless communication link 44 connects the two. In some examples, control system 42 comprises a computer that enables coordinator 40 to select and initiate a desired drill To run man-down drill 50, for instance, coordinator 40 uses a mouse-click (or some other known input means) to select man-down drill 50. Control system 42 records the coordinator's chosen drill and the input's time of entry (drill initiation timestamp 56) and sends a chosen drill signal 54 (e.g., man-down drill 50) to annunciator 46. Annunciator 46 then emits an audible alarm 48', 50' or 52', i.e., the one corresponding to man-down drill 50. Audible alarms 48', 50' and 52' are distinguishable from each other in some way, e.g., by pitch, tone, number of beeps, duration of beep, etc. In some examples, for instance, first alarm 48' is one beep, second alarm 50' is two beeps and third alarm 52' is three beeps. The number of beeps, in this example, tells the group of workers 38 which drill to perform. When coordinator 40 observes or otherwise becomes aware that workers 38 have completed the chosen drill, coordinator 40 uses control system 42 to record a drill completion timestamp 58. Control system 42 then generates report 60 documenting the chosen drill, initiation timestamp 56 and completion timestamp 58.

In some examples, H2S alarm method 36 is carried out as shown in FIG. 4, wherein block 67 illustrates coordinator 40 using control system 42 for selecting one of three safety drills comprising a shut-in drill, a man-down drill and an evacuation drill. Block 69 illustrates transmitting a chosen drill signal from control system 42 to annunciator 46, wherein the chosen drill signal identifies which of the three safety drills coordinator 40 selected. Block 71 illustrates in response to the chosen drill signal, annunciator 46 emitting first audible alarm 48' if coordinator 40 selected the shut-in drill. Block 73 illustrates in response to the chosen drill signal, annunciator 46 emitting second audible alarm 50' if coordinator 40 selected the man-down drill. Block 75 illustrates in response to the chosen drill signal, annunciator 46 emitting third audible alarm 52' if coordinator 40 selected the evacuation drill, wherein the first audible alarm, the second audible alarm and the third audible alarm are distinguishable from each other. Block 77 illustrates in response to annunciator 46 emitting at least one of the first audible alarm, the second audible alarm and the third audible alarm, the group of workers 38 performing and completing a chosen drill associated with the chosen drill signal 54. Block 79 illustrates assigning drill initiation timestamp 56 to the chosen drill. Block 81 illustrates assigning drill completion timestamp 58 to the chosen drill. Block 83 illustrates control system 42 generating report 60 documenting the chosen drill and further documenting drill initiation timestamp 56 and/or drill completion timestamp 58.

Figure 5:
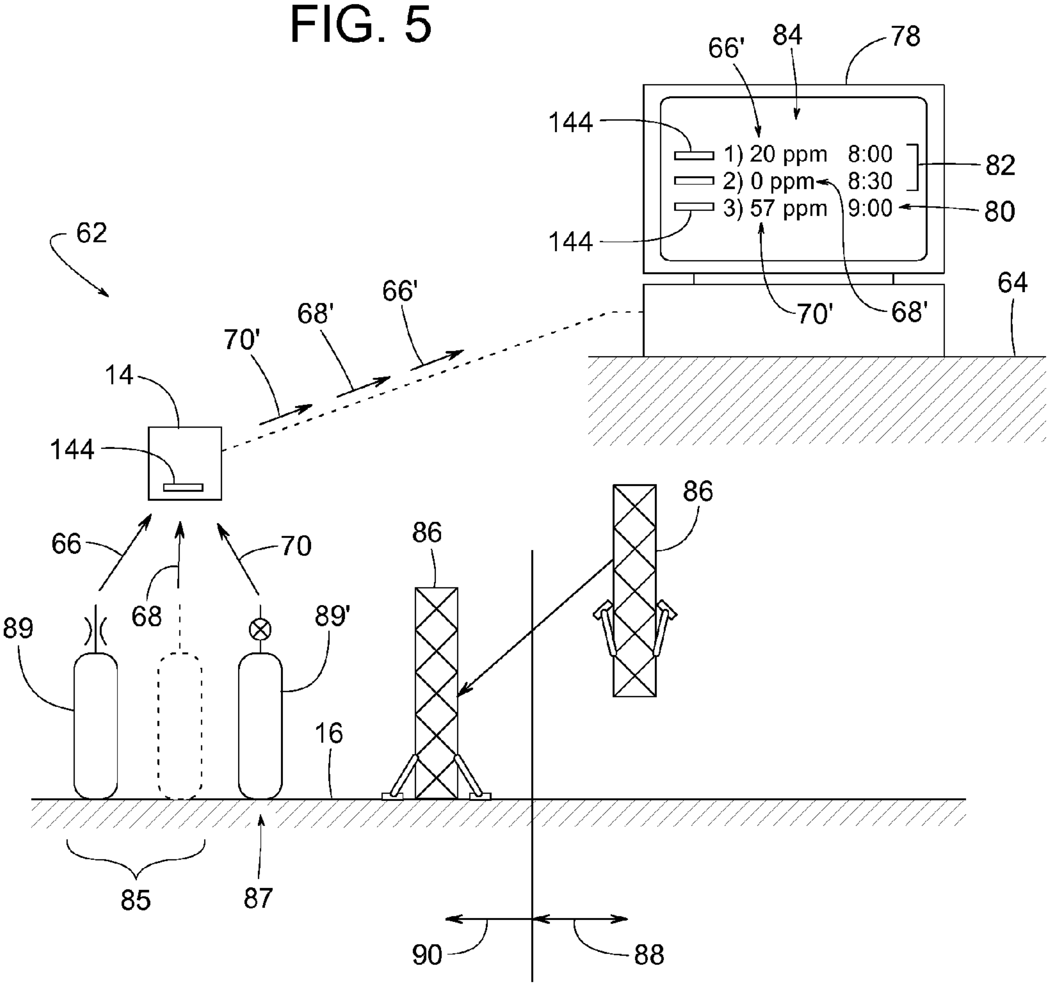
FIG. 5 is a schematic diagram of another example H2S alarm method (calibration method).
Figure 6:
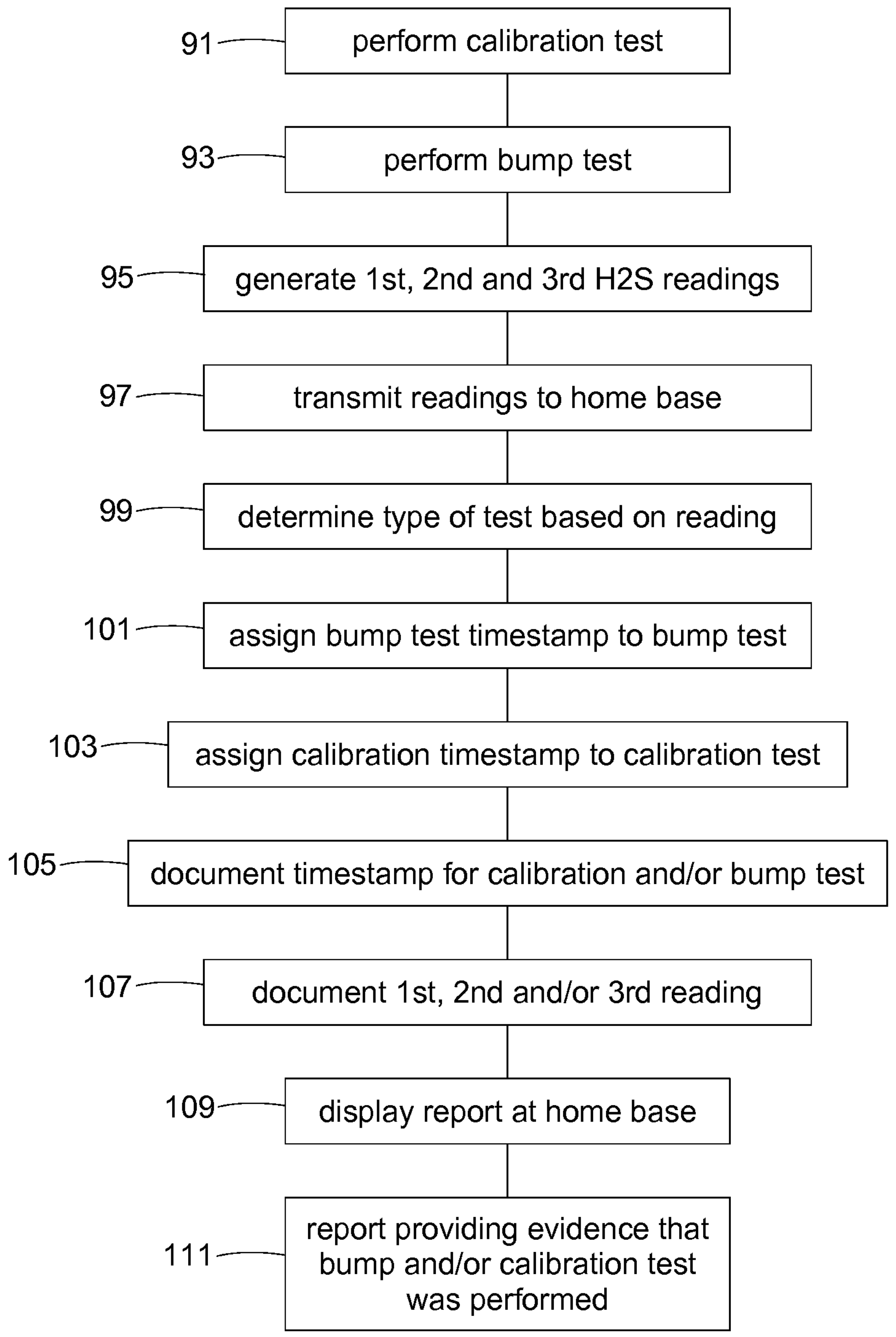
FIG. 6 is a block diagram further illustrating the H2S alarm method shown in FIG. 5.

FIGS. 5 and 6 illustrate an example H2S alarm method 62 for automatically distinguishing and documenting various H2S related tests, such as a calibration test 85 and a bump test 87. In some examples, calibration test 85 involves using a pressurized canister 89 of H2S gas to expose H2S monitor 14 with a predetermined first concentration of H2S gas 66, such as a concentration of 20 ppm, and at another time exposing H2S monitor 14 to a second concentration of H2S gas 68 of substantially zero ppm. The resulting response of H2S monitor 14 is then noted or adjusted accordingly.

Bump test 87, in some examples, involves using a canister 89' to expose H2S monitor 14 with a third concentration of H2S gas 70 that is appreciably greater in concentration than the predetermined first concentration 66. In the illustrated example, the third concentration of H2S gas 70 is 57 ppm. Calibration test 85 is used for establishing the accuracy of H2S monitor 14, and bump test 87 provides a simple means for determining whether H2S monitor 14 is even functional.

In some examples, method 62 ensures that calibration test 85 is performed and documented during an equipment setup period 88, prior to an operational period 90 of well bore equipment 86. Well bore equipment 86 is machinery used in the drilling or servicing of a well bore. Examples of well bore equipment 86 include, but are not limited to, a derrick, drilling rig, workover rig, etc.

One example operational sequence of H2S alarm method 62 is as follows. A work crew during setup period 88 sets up equipment 86 at worksite 16 (e.g., a well bore). Prior to fully operating equipment 86 during operational period 90, calibration test 85 is run. H2S monitor 14 is exposed sequentially to H2S gas concentrations 66 and 68 (or in reverse order), and the monitor's resulting first and second readings 66' and 68', respectively, are wirelessly transmitted to a computer system 78 at a remote home base 64. Computer system 78 generates a report 84 documenting readings 66' and 68' and assigns them a calibration timestamp 82. If readings 66' and 68' indicate that H2S monitor 14 is properly calibrated and functional, equipment 86 is cleared for use during operational period 90.

To ensure H2S monitor 14 remains functional, bump test 87 is performed periodically during operational period 90. In the illustrated example, H2S monitor 14 is exposed to H2S gas concentration 70, and the monitor's resulting third reading 70' is wirelessly transmitted to computer system 78. Through report 84, computer system 78 documents reading 70' and assigns it a bump test timestamp 80.

Based on the values of readings 66', 68' and 70', computer system 78 determines whether a particular reading is from calibration test 85 or from bump test 87. In some examples, computer system 78 determines a reading is from calibration test 85 if the reading is within a first predetermined range (e.g., within 5 ppm, or between 0 and 25 ppm, etc.) of the monitor's predetermined threshold (e.g., 20 ppm). Examples of said first predetermined range include, but are not limited to, within 5 ppm of 20 ppm, within 0 to 25 ppm, etc. The predetermined threshold is the chosen value at which H2S monitor 14 emits an alarm. In some examples, computer system 78 determines a reading is from calibration test 85 if the reading is within a second predetermined range of zero (e.g., within 5 ppm of zero ppm) and/or has a timestamp indicating a predetermined time span between readings 66' and 68'. In some examples, computer system 78 determines a reading is from bump test 87 if the reading is of a predetermined limited duration and exceeds the predetermined threshold (e.g., 20 ppm) by at least a predetermined amount (e.g., by at least 15 ppm more than the predetermined threshold).

In some examples, H2S alarm method 62 is carried out as shown in FIG. 6, wherein block 91 illustrates performing a calibration test on H2S monitor 14, wherein the calibration test involves during a first period exposing H2S monitor 14 to a first concentration of H2S that is within a first predetermined range of a predetermined threshold of the H2S monitor, the calibration test also involves during a second period exposing H2S monitor 14 to a second concentration of H2S that is within a second predetermined range of zero. Block 93 illustrates performing a bump test on H2S monitor 14, wherein the bump test involves during a third period exposing H2S monitor 14 to a third concentration of H2S gas that exceeds the predetermined threshold by at least a predetermined amount. Block 95 illustrates H2S monitor 14 generating first reading 66', second reading 68' and third reading 70' corresponding respectively to the first concentration of H2S gas 66, the second concentration of H2S gas 68, and the third concentration of H2S gas 70. Block 97 illustrates transmitting first reading 66', second reading 68' and third reading 70' from H2S monitor 14 to home base 64. Block 99 illustrates based on readings 66', 68' and/or 70', determining whether a performed test was calibration test 85 or the bump test 87. Block 101 illustrates computer system 78 assigning bump test timestamp 80 to the bump test. Block 103 illustrates computer system 78 assigning calibration timestamp 82 to the calibration test. Block 105 illustrates computer system 78 generating report 84 documenting bump test timestamp 80 and/or calibration timestamp 82. Block 107 illustrates computer system 78 documenting via report 84 at least one of readings 66', 68' and 70'. Block 109 illustrates computer system 78 displaying report 84 at home base 64. Block 111 illustrates based on at least one of readings 66', 68' and 70'; report 84 providing evidence indicating whether the bump test or the calibration test was performed.

Additional points worth noting include the following: A group of workers is any group of people. In some examples, a group of workers includes the coordinator. In some examples, a timestamp includes the time of day and the date. In some examples, an H2S monitor includes an H2S sensor. A single page means a single sheet or a single screenshot on a computer. The term, "significantly exceeds" means at least 50% greater than a certain value or threshold. The term, "substantially equal to the threshold" means a value or reading that is within 20% of the threshold. A report can be a single page, a single screenshot, multiple pages, or multiple screenshots.

Figure 7:
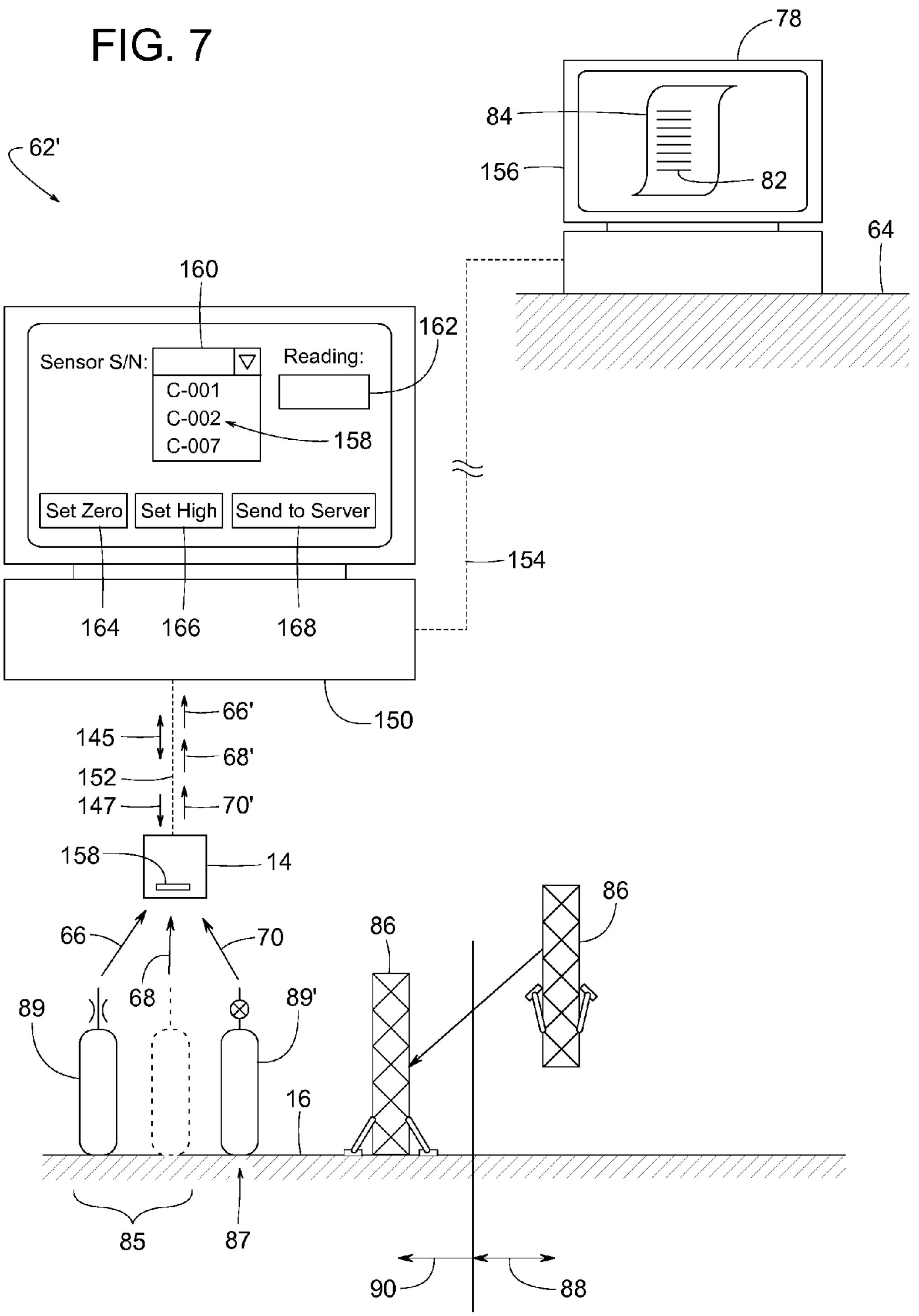
FIG. 7 is a schematic diagram of another example H2S alarm method (another calibration method).
Figure 8:
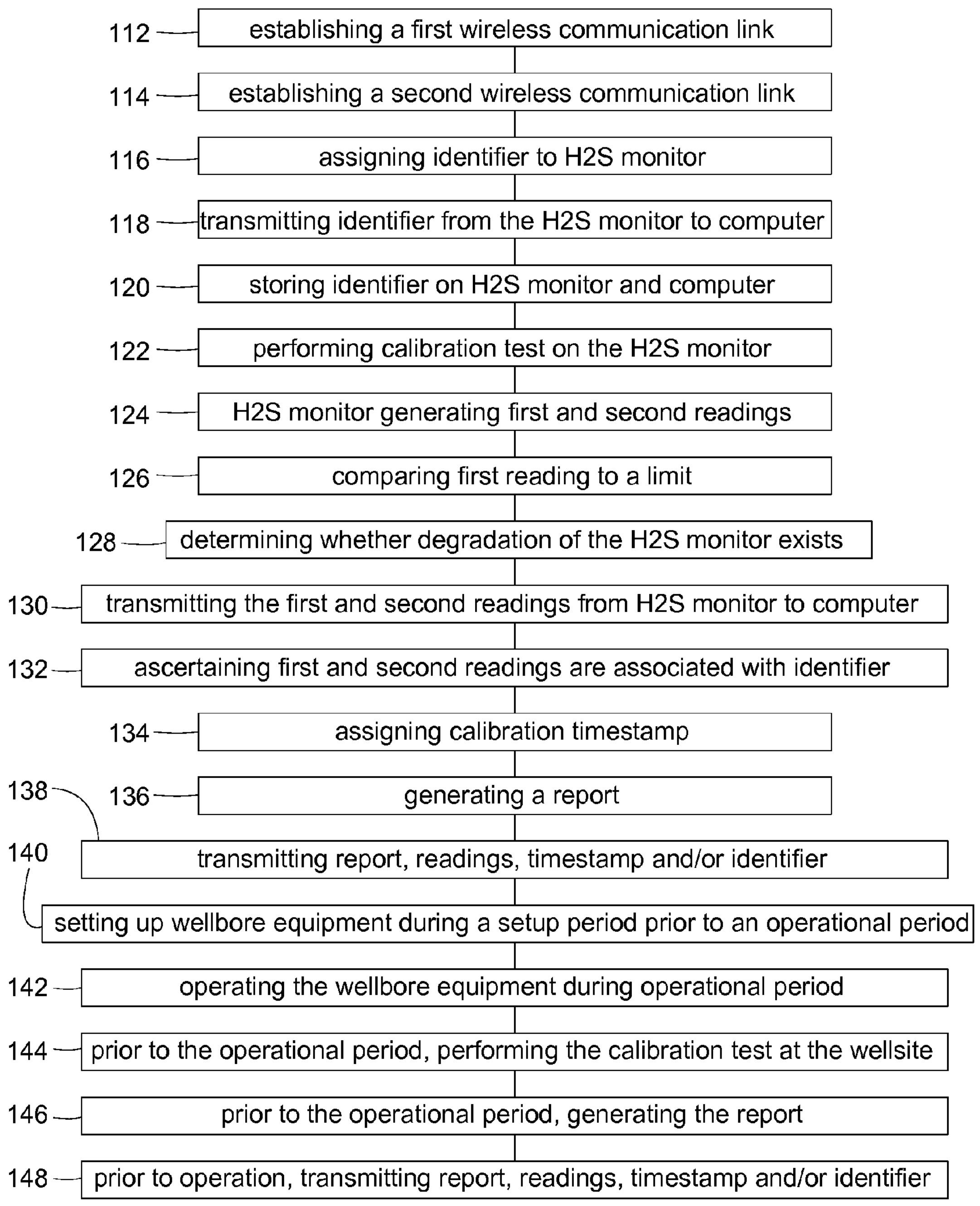
FIG. 8 is a block diagram illustrating the H2S alarm method shown in FIG. 7.

In some examples, an H2S alarm method 62' (e.g., calibration method) is illustrated and carried out as shown in FIGS. 7 and 8. In this example, H2S alarm method 62' uses a computer 150 in calibrating H2S monitor 14. The term, "computer" refers to any digital device for inputting, outputting, processing and storing information such as readings and other data. A first wireless communication link 152 conveys information between computer 150 and H2S monitor 14, and a second longer wireless communication link 154 conveys information between computer 150 and a server system 156. The term, "server system" refers to any digital or microprocessor based component or collection of components that receives and/or transmits communication signals via the Internet. First link 152 being relatively short avoids potential signal interference with distant H2S monitors that are well beyond worksite 16 while second link 154, being much longer, allows the exchange of reports and other information with digital devices at remote locations.

In some examples of H2S alarm method 62', the calibration of H2S monitor 14 is as follows. A technician notes an identifier 158 of a chosen H2S monitor 14 about to be calibrated. The term, "identifier" refers to a unique serial number (e.g., alphanumeric) that distinguishes H2S monitor 14 from all other H2S monitors. Identifier 158, along with a plurality of other identifiers of other H2S monitors that might be in communication with computer 150 are stored on computer 150. The technician, in some examples, uses a drop-down box 160 to select the chosen identifier 158 on computer 150. The technician triggers H2S monitor 14 to begin sending H2S readings to computer 150, and computer 150 displays those readings at some location 162 on computer 150.

The technician then zeros H2S monitor 14 by exposing monitor 14 to atmospheric air substantially void of H2S gas. While monitor 14 is exposed to atmospheric air with a substantially zero concentration of H2S, the technician hits a "Set Zero" button 164 on computer 150. Computer 150 responds by assigning a zero value to the reading received from H2S monitor 14, whereby monitor 14 is now zeroed.

Next, H2S monitor 14 is exposed to a concentration of about 25 ppm of H2S and the monitor's readings are sent to computer 150. When the readings seem to peak or reach a steady state, the technician hits a "Set High" button 166 on computer 150. Computer 150 responds by assigning a value of 25 ppm to the monitor's peak steady state reading. If the actual peak reading is significantly lower than 25 ppm, that might indicate that the monitor is degrading and may need to be replaced or repaired. If the peak reading is acceptably close to the target 25 ppm, the monitor will be properly calibrated.

For example, if during the calibration process, H2S monitor 14 sends a reading of only 20 ppm when monitor 14 is actually exposed to 25 ppm, pressing "Set High" button 166 causes computer 4 to send a calibration signal 147 to H2S monitor 14, wherein calibration signal 147 adjusts H2S monitor 14 to display 25 ppm (rather than 20 ppm) whenever exposed to 25 ppm. Also, for any future H2S exposures between 0 and 25 ppm, H2S monitor 14 is adjusted proportionally. In some examples, in other words, when H2S monitor 14 is exposed to 25 ppm of calibrated H2S gas, monitor 14 is suppose to generate 25 mA for a reading of 25 ppm (1 mA per 1 ppm H2S). Prior to calibration, however, monitor 14 is only generating 20 mA and is displaying a reading of only 20 ppm when exposed to 25 ppm of H2S. To correct this through calibration, computer 14 sends (via wireless communication link 152) calibration signal 147 to H2S monitor 14, wherein calibration signal 147 resets the monitor's ppm/mA conversion value from 1 ppm per 1 mA to 1.25 ppm per 1 mA. Consequently, after calibration, when monitor 14 is exposed to H2S of 25 ppm, monitor 14 generates 20 mA which will now display a correctly calibrated gas reading of 25 ppm ($20\times1.25=25$). Likewise, when monitor 14 is exposed to 20 ppm, it will only generate 16 mA; however, 16 mA times 1.25 ppm/mA equals 20 ppm, thus the properly calibrated H2S monitor 14 will correctly display 20 ppm. It should be noted that first wireless communication link 152 establishes two-way communication 145 between computer 150 and H2S monitor 14 so that monitor 14 can send gas readings (e.g., 66', 68' and 70') to computer 150, and computer 150 can send calibration signal 147 to H2S monitor 14.

Once properly calibrated, the technician can hit a "Send to Server" button 168. Computer 150 responds by sending the calibration information over the second wireless communication link 154 from computer 150 to server system 156. Computer 150 and/or server system 156 generates report 84 with information documenting the calibration event. Examples of information in report 84 include one or more of the following: calibration date, calibration time of day, location of where the calibration occurred, monitor's identifier 158, zero value prior to calibration, zero value after calibration, peak reading before calibration, calibrated target reading, battery condition, next scheduled calibration due date, technician's name, and place for the technician to sign report 84. In some examples, computer 150 and/or server system 156 sends report 84 via email, text message, etc. to one or more designated locations where report 84 can be printed and signed by the technician.

Some examples of method 62' follow at least some of the procedures shown in FIG. 8, wherein block 112 illustrates establishing first wireless communication link 152 between H2S monitor 14 and computer 150. Block 114 illustrates establishing second wireless communication link 154 between computer 150 and server system 156, wherein second wireless communication link 154 is longer than first wireless communication link 152. Block 116 illustrates assigning identifier 158 to H2S monitor 14. Block 118 illustrates first wireless communication link 152 transmitting identifier 158 from H2S monitor 14 to computer 150. Block 120 illustrates storing identifier 158 on both H2S monitor 14 and on computer 150.

Block 122 illustrates performing a calibration test on H2S monitor 14 (i.e., calibrating the monitor), wherein the calibration test involves during a first period exposing H2S monitor 14 to a first concentration of H2S 66 that is within a first predetermined range of a predetermined threshold of H2S monitor 14, wherein the first predetermined range is between a lower limit and an upper limit, and the calibration test also involves during a second period exposing H2S monitor 14 to a second concentration of H2S 68 that is within a second predetermined range of zero (e.g., less than 2 ppm of H2S). In some examples, the predetermined threshold is 25 ppm of H2S, and the first predetermined range is 20 to 30 ppm H2S (20 being the lower limit, and 30 being the upper limit).

Block 124 illustrates H2S monitor 14 generating first reading 66' and second reading 68' corresponding respectively to first concentration of H2S 66 and second concentration of H2S 68. Block 126 illustrates comparing first reading 66' to the lower limit. Block 128 illustrates based on comparing first reading 66' to the lower limit, determining whether degradation of H2S monitor 14 exists. For instance, if first reading 66' is more than 5 ppm less than a threshold of 25 ppm or if first reading 66' is less than the lower limit of 20 ppm, then that would indicate that H2S monitor 14 has degraded appreciably.

Block 130 illustrates first wireless communication link 152 transmitting first reading 66' and second reading 68' from H2S monitor 14 to computer 150. Block 132 illustrates based on identifier 158 stored on both H2S monitor 14 and on computer 150 being a match or are equivalent, computer 150 ascertaining first reading 66' and second reading 68' are associated with identifier 158. Block 134 illustrates assigning a calibration timestamp 82 (e.g., date and/or time of day) to the calibration test. In some examples, calibration timestamp 82 is generated by computer 150. In some examples, calibration timestamp 82 is generated by H2S monitor 14. In some examples, calibration timestamp 82 is generated by server system 156.

Block 136 illustrates generating report 84 based on first reading 66', second reading 68', calibration timestamp 82 and identifier 158. In some examples, one or more parts of report 84 are generated by computer 150, server system 156 and/or H2S monitor 14. Block 138 illustrates transmitting from computer 150 to server system 156 at least one of report 84, first reading 66', second reading 68', calibration timestamp 82 and identifier 158.

In some examples, to ensure the H2S monitors are calibrated prior to drilling or servicing a well, block 140 illustrates setting up wellbore equipment 86 at a wellsite (worksite 16) during setup period 88 that is prior to operational period 90. Block 142 illustrates operating wellbore equipment 86 during operational period 90. Block 144 illustrates prior to operational period 90, performing the calibration test at wellsite 16. Block 146 illustrates prior to operational period 90, generating report 84. And block 148 illustrates prior to operational period 90, transmitting from computer 150 to server system 156 at least one of report 84, first reading 66', second reading 68', calibration timestamp 82 and identifier 158.

Some example HS2 alarm methods are defined as follows: An H2S alarm method responsive to an alarm event characterized by an alarming level of H2S at a worksite that is remote relative to a home base, remote relative to a person-A and remote relative to a person-B, the H2S alarm method comprising: an H2S monitor sensing the alarming level of H2S at the worksite; assigning an alarm timestamp to the alarm event; assigning an alarm title to the alarm event; the H2S monitor generating an alarm signal as a consequence of sensing the alarming level of H2S at the worksite; wirelessly transmitting the alarm signal to the person-A and to the person-B, wherein one of the person-A and the person-B is a first-to-respond person; the first-to-respond person responding to the alarm signal; assigning a response timestamp to the first-to-respond person, the response timestamp identifying a time-of-day at which the first-to-respond person responded to the alarm signal; and a computer system generating a report documenting the alarm event, the alarm title, a response time, and a person-identifier identifying the first-to-respond person, wherein the response time is at least one of the following: (a) a difference between the alarm timestamp and the response timestamp, and (b) a display of both the alarm timestamp and the response timestamp. In some examples the person-A and the person-B are remote relative to each other. In some examples the H2S monitor is remote relative to the computer system. In some examples the computer system is at the home base. In some examples the person-A and the person-B are remote relative to the home base. In some examples one of the person-A and the person-B is a slower-to-respond person, and the slower-to-respond person responds to the alarm signal after the first-to-respond person responds to the alarm signal. In some examples one of the person-A and the person-B is a slower-to-respond person, and the slower-to-respond person fails to respond to the alarm signal. In some examples the response time is the difference between the alarm timestamp and the response timestamp. In some examples the response time is the display of both the alarm timestamp and the response timestamp.

Although the invention is described with respect to a preferred embodiment, modifications thereto will be apparent to those of ordinary skill in the art. The scope of the invention, therefore, is to be determined by reference to the following claims:

The invention claimed is:

1. An H2S alarm method involving at least one of a server system, an H2S monitor and a computer, the H2S alarm method comprising:

establishing a first wireless communication link between the H2S monitor and the computer;

establishing a second wireless communication link between the computer and the server system, wherein the second wireless communication link is longer than the first wireless communication link;

assigning an identifier to the H2S monitor;

performing a calibration test on the H2S monitor, wherein the calibration test involves during a first period exposing the H2S monitor to a first concentration of H2S that is within a first predetermined range of a predetermined threshold of the H2S monitor, the calibration test also involves during a second period exposing the H2S monitor to a second concentration of H2S that is within a second predetermined range of zero;

the H2S monitor generating a first reading and a second reading corresponding respectively to the first concentration of H2S and the second concentration of H2S;

the first wireless communication link transmitting the first reading and the second reading from the H2S monitor to the computer;

the computer ascertaining the first reading and the second reading are associated with the identifier;

assigning a calibration timestamp to the calibration test;

generating a report based on the first reading, the second reading, the calibration timestamp and the identifier; and transmitting from the computer to the server system at least one of the report, the first reading, the second reading, the calibration timestamp and the identifier.

2. The H2S alarm method of claim 1, wherein the first predetermined range is between a lower limit and an upper limit, and the H2S alarm method further comprising:

comparing the first reading to the lower limit; and based on comparing the first reading to the lower limit, determining whether degradation of the H2S monitor exists.

3. The H2S alarm method of claim 1, further comprising the first wireless communication link transmitting the identifier from the H2S monitor to the computer.

4. The H2S alarm method of claim 1, wherein the identifier is alphanumeric.

5. The H2S alarm method of claim 1, further comprising storing the identifier on both the H2S monitor and on the computer.

6. The H2S alarm method of claim 1, further comprising:

storing the identifier on both the H2S monitor and on the computer; and based on the identifier stored on both the H2S monitor and on the computer being a match, the computer ascertaining the first reading and the second reading are associated with the identifier.

7. The H2S alarm method of claim 1 further comprising:

setting up wellbore equipment at a wellsite during a setup period that is prior to an operational period;

operating the wellbore equipment during the operational period;

prior to the operational period, performing the calibration test; and prior to the operational period, generating the report.

8. The H2S alarm method of claim 1 further comprising:

setting up wellbore equipment at a wellsite during a setup period that is prior to an operational period;

operating the wellbore equipment during the operational period;

prior to the operational period, performing the calibration test at the wellsite;

prior to the operational period, generating the report; and prior to the operational period, transmitting at least one of the report, the first reading, the second reading, the calibration timestamp and the identifier to the server system.

9. The H2S alarm method of claim 1, wherein at least one of the computer and the server system generates the report.

10. The H2S alarm method of claim 1, wherein the calibration test further involves the computer sending via the first wireless communication link a calibration signal to the H2S monitor, whereby the first wireless communication link establishes two-way communication between the computer and the H2S monitor.

11. An H2S alarm method involving at least one of a server system, an H2S monitor and a computer, the H2S alarm method comprising:

establishing a first wireless communication link between the H2S monitor and the computer;

establishing a second wireless communication link between the computer and the server system, wherein the second wireless communication link is longer than the first wireless communication link;

assigning an identifier to the H2S monitor;

the first wireless communication link transmitting the identifier from the H2S monitor to the computer;

storing the identifier on both the H2S monitor and on the computer;

performing a calibration test on the H2S monitor, wherein the calibration test involves during a first period exposing the H2S monitor to a first concentration of H2S that is within a first predetermined range of a predetermined threshold of the H2S monitor, the calibration test also involves during a second period exposing the H2S monitor to a second concentration of H2S that is within a second predetermined range of zero;

the H2S monitor generating a first reading and a second reading corresponding respectively to the first concentration of H2S and the second concentration of H2S;

the first wireless communication link transmitting the first reading and the second reading from the H2S monitor to the computer;

based on the identifier stored on both the H2S monitor and on the computer being a match, the computer ascertaining the first reading and the second reading are associated with the identifier;

assigning a calibration timestamp to the calibration test;

generating a report based on the first reading, the second reading, the calibration timestamp and the identifier; and transmitting from the computer to the server system at least one of the report, the first reading, the second reading, the calibration timestamp and the identifier.

12. The H2S alarm method of claim 11, wherein the first predetermined range is between a lower limit and an upper limit, and the H2S alarm method further comprising:

comparing the first reading to the lower limit; and based on comparing the first reading to the lower limit, determining whether degradation of the H2S monitor exists.

13. The H2S alarm method of claim 11, wherein the identifier is alphanumeric.

14. The H2S alarm method of claim 11 further comprising:

setting up wellbore equipment at a wellsite during a setup period that is prior to an operational period;

operating the wellbore equipment during the operational period;

prior to the operational period, performing the calibration test; and prior to the operational period, generating the report.

15. The H2S alarm method of claim 11 further comprising:

setting up wellbore equipment at a wellsite during a setup period that is prior to an operational period;

operating the wellbore equipment during the operational period;

prior to the operational period, performing the calibration test at the wellsite;

prior to the operational period, generating the report; and prior to the operational period, transmitting at least one of the report, the first reading, the second reading, the calibration timestamp and the identifier to the server system.

16. The H2S alarm method of claim 11, wherein at least one of the computer and the server system generates the report.

17. The H2S alarm method of claim 11, wherein the calibration test further involves the computer sending via the first wireless communication link a calibration signal to the H2S monitor, whereby the first wireless communication link establishes two-way communication between the computer and the H2S monitor.

18. An H2S alarm method involving at least one of a server system, an H2S monitor and a computer, the H2S alarm method comprising:

establishing a first wireless communication link between the H2S monitor and the computer;

establishing a second wireless communication link between the computer and the server system, wherein the second wireless communication link is longer than the first wireless communication link;

assigning an identifier to the H2S monitor;

the first wireless communication link transmitting the identifier from the H2S monitor to the computer;

storing the identifier on both the H2S monitor and on the computer;

performing a calibration test on the H2S monitor, wherein the calibration test involves during a first period exposing the H2S monitor to a first concentration of H2S that is within a first predetermined range of a predetermined threshold of the H2S monitor, wherein the first predetermined range is between a lower limit and an upper limit, and the calibration test also involves during a second period exposing the H2S monitor to a second concentration of H2S that is within a second predetermined range of zero;

the H2S monitor generating a first reading and a second reading corresponding respectively to the first concentration of H2S and the second concentration of H2S;

comparing the first reading to the lower limit;

based on comparing the first reading to the lower limit, determining whether degradation of the H2S monitor exists;

the first wireless communication link transmitting the first reading and the second reading from the H2S monitor to the computer;

based on the identifier stored on both the H2S monitor and on the computer being a match, the computer ascertaining the first reading and the second reading are associated with the identifier;

assigning a calibration timestamp to the calibration test;

generating a report based on the first reading, the second reading, the calibration timestamp and the identifier;

transmitting from the computer to the server system at least one of the report, the first reading, the second reading, the calibration timestamp and the identifier;

setting up wellbore equipment at a wellsite during a setup period that is prior to an operational period;

operating the wellbore equipment during the operational period;

prior to the operational period, performing the calibration test at the wellsite;

prior to the operational period, generating the report; and prior to the operational period, transmitting from the computer to the server system at least one of the report, the first reading, the second reading, the calibration timestamp and the identifier.

19. The H2S alarm method of claim 18, wherein the identifier is alphanumeric.

20. The H2S alarm method of claim 18, wherein at least one of the computer and the server system generates the report.

* * * * *